United States Patent [15] 3,700,871
Montgomery, Jr. et al. [45] Oct. 24, 1972

[54] MULTIPLE MULTIPLEXER GAIN-RANGING AMPLIFIER

[72] Inventors: William C. Montgomery, Jr.; Charles B. Vogel, both of Houston, Tex.

[73] Assignee: Shell Oil Company, New York, N.Y.

[22] Filed: June 21, 1971

[21] Appl. No.: 155,084

Related U.S. Application Data

[63] Continuation-in-part of Ser. No. 864,998, Oct. 9, 1969.

[52] U.S. Cl. .....235/154, 340/347 AD, 340/15.5 GC
[51] Int. Cl. ...........................G01v 1/28, H03r 13/02
[58] Field of Search ........235/154, 155; 340/347 AD, 15.5 R, 340/15.5 DP, 15.5 GC, 15.5 MC

[56] References Cited

UNITED STATES PATENTS

| | | | |
|---|---|---|---|
| 3,299,421 | 1/1967 | Neitzel | 340/347 AD |
| 3,376,557 | 4/1968 | Godinez | 340/15.5 R |
| 3,525,072 | 8/1970 | Born et al. | 340/15.5 DP |
| 3,525,948 | 8/1970 | Sherer et al. | 340/15.5 GC |

*Primary Examiner*—Thomas A. Robinson
*Attorney*—Harold L. Denkler et al.

[57] ABSTRACT

One hundred low frequency analog signal channels having a very large dynamic range may be amplified to at least half of full scale of a 14-bit analog to digital converter without distortion by an amplifier system that includes a preamplifier for each channel, a filter system for each channel, a gain-ranging multiplexer time-shared between 10 channels, and a second multiplexer that time shares the output of the gain-ranging multiplexers with an instantaneous gain-ranging amplifier. The gain-ranging multiplexer performs part of the multiplexing function and supplies sufficient gain ahead of the second multiplexer, a high speed, higher noise level multiplexer to mask the noise introduced into the system thereby. The output of the system is typically digitized.

4 Claims, 14 Drawing Figures

| SIGNAL POLARITY | GAIN | ADC SIGN | |
|---|---|---|---|
| + | EVEN | 0 | ADC CORRECT |
| + | ODD | 1 | COMPLEMENT ADC |
| − | EVEN | 1 | ADC CORRECT } POSSIBILITY OF 2's COMPLEMENT |
| − | ODD | 0 | COMPLEMENT ADC } POSSIBILITY OF 2's COMPLEMENT |

DIGITAL POLARITY CORRECTION TECHNIQUE

| GAIN | MSB | LBS |
|---|---|---|
| 1 | 0 | 0 |
| 4 | 0 | 1 |
| 16 | 1 | 0 |

MULTIPLE MULTIPLEXER GAIN-RANGING AMPLIFIER

CROSS REFERENCE TO RELATED APPLICATIONS

This application is a continuation-in-part to applicants' copending application, Ser. No. 864,998, filed Oct. 9, 1969, titled "Time Shared Instantaneous Gain-Ranging Amplifier."

BACKGROUND OF THE INVENTION

The present invention relates to amplifiers in general; and more particularly, it relates to gain-ranging amplifiers to be time-shared among many signal sources. In particular, the signal sources may be seismic signals, and the amplifier would be used to accurately amplify seismic signals collected from any array of geophones.

Seismic prospecting is the technique whereby acoustic energy is put into the earth at one point so that seismic waves propagate down into the earth and reflect or refract from the discontinuities in the background rock structure. Seismic waves are generated by dynamite, vibrators, or other sources of acoustic energy positioned near the earth's surface, and travel down into the earth in all directions, changing speed and direction as they encounter different underground rock boundaries. The energy in the incident seismic wave, reflected back to the surface by the boundaries, is called a reflection wave and can yield significant information about the geologic structures within the earth.

Seismic reflections are detected at the surface by seismic receivers, such as geophones or hydrophones, that convert acoustic energy to a time-varying electrical signal whose amplitude is related to the amplitude of ground motion.

Typically, many seismic receivers are set out in a pattern, called an array, with one or more receivers representing one element or receiving station in the array. The outputs of the receiving stations can be thought of as a set of time-varying signals with one signal representing an element of a set. Actually, each seismic data signal usually represents the output of a group of receivers connected together and so spaced to cancel unwanted horizontally traveling waves.

The electrical signals generated by the geophones are typically amplified and recorded on some recording medium such as magnetic tape. Signals are recorded during the time period from just prior to the detonation of the explosive charge, in the case of dynamite, to a few seconds thereafter.

After recording, the data must be put into a readily interpretable form, such as a seismic section, and it must be interpreted.

The technique of seismic prospecting as described above has been used very successfully in the past fifty or so years. In fact, it has been so successful that most of the large oil reservoirs that are easily detectable with the seismic method have been discovered. But even though the large reservoirs have been discovered, it is believed that vast quantities of oil remain yet to be discovered. The undiscovered oil would be contained in many small stratographic traps and other small reservoirs that are largely undetectable by the old, crude seismic exploration techniques.

To find the small oil reservoirs, the resolving power of the seismic exploration technique must be substantially improved. To do this, the trend has been increasingly to use larger and larger arrays of geophones and to use digital techniques for both recording the data and processing it.

The present invention attacks two problems associated with accumulating high resolution seismic data. First, it is essential that the recorded seismic data accurately represent the seismic signals received at the geophone array. The problem comes in amplifying the signals from the geophone. Since seismic signals of interest vary from less than 1 microvolt to 1 volt, the seismic amplifier must be able to respond and accurately amplify a signal that varies by seven orders of magnitude.

In the past, seismologists have attempted to solve the amplification problem by using what are known as "programmed gain amplifiers" or "automatic gain amplifiers" or more recently gain-ranging amplifiers. By gain-ranging amplifier is meant an amplifier that changes its gain in discrete steps in accordance with some predetermined plan. Most often, the envelope of the amplifier input signal is detected and the gain is changed in accordance therewith to maintain the output signal above some predetermined level. Typically the gain-ranging function is achieved by switching between various feedback impedances in an operational amplifier circuit. The objection to this approach is the long time required for the amplifier to settle after a feedback impedance has been switched. Because of this limitation, the amplifier can react only very slowly to changes in the input signal. Thus, in the case of seismic reflection signals, the amplifier often saturates because it is unable to respond quickly enough to the large change in input signal amplitude.

The most recent attempt at solving the problem is illustrated by the patent to Loofbourrow, U.S. Pat. No. 3,241,100. Loofbourrow teaches an instantaneous gain-ranging scheme that is fundamentally sound but suffers from severe disadvantages that would make it inoperable with present-day technology. The Loofbourrow approach is to cascade a series of fixed-gain amplifiers together. The output of each amplifier is monitored by threshold circuit and is switchable onto a common output line. Starting with the amplifier having the largest output signal, the first amplifier output that is not saturated is detected and switched into the common output line. With this scheme the large settling time caused by switching feedback resistors is avoided. But because of the large expense of such an amplifier system, it is not economically feasible to have one for each seismic channel. Thus, Loofbourrow uses a conventional multiplexing scheme to time-share the amplifier with 43 seismic data channels.

Although the basic concept of the Loofbourrow patent as described above is sound, there are several defects that either make it inoperative or undesirable.

1. The Loofbourrow approach does not show any gain in front of the multiplexer. Without premultiplexer gain, much of the seismic information of interest would be lost in the system noise. For example, about the best multiplexers available today introduce at least 100 microvolts of noise into the system. But seismic signals are of interest down to less than 1 microvolt. Thus, it can be seen that seismic information up to at least 100 microvolts would be lost merely because of the multiplexer noise. In addition, since an instantaneous gain-ranging scheme is being used, the individual stages of the gain-ranger must be wide-band amplifiers. But if the amplifiers are wide-band, they necessarily introduce additional noise into the system. Thus, substantially more than 100 microvolts of seismic information would be lost in the system of Loofbourrow.

2. The individual stages of Loofbourrow's instantaneous gain-ranger appear to be capacitatively coupled as indicated in FIG. 3 at 182. AC-coupled stages of an instantaneous gain-ranger suffer from the following problem. During any given period of time, any number of stages in the gain-ranger may be limiting. While a given stage is limiting, the capacitive input thereof will be charging. If, after the capacitive input to a given stage has been charging for sometime, the stage is called upon to operate as the final stage of the amplifier chain, that is in a linear region, it will be unable to do so since the capacitive input must discharge before the amplifier stage can operate linearly. This is important since the gain-ranging amplifier, even if it is not time-shared, is still changing states continuously in response to the input signal level. In other words, there may be three stages operating or four stages operating, or any number depending on the input signal level; and at any arbitrary time the gain-ranger may change from one given state to another. Thus, it can be seen that DC-coupling between stages is an absolute necessity for the proper operation of this circuit. In the Loofbourrow patent, the gain stages are not DC-coupled.

The problem would never be discovered in a typical laboratory testing of the circuit where only sine waves were used as testing signals, since a symmetrical sine wave would charge and discharge the capacitive input in equal amounts. However, any signal with a DC component other than zero, or a signal with a zero DC component but with an asymmetrical configuration would cause the circuit to malfunction. Certainly signals to be expected in seismic prospecting would cause the Loofbourrow circuit to malfunction.

However, coupling DC amplifiers with extremely high gain is a difficult proposition. Particularly, it is difficult to maintain the operating points of the various stages of the amplifier within a minimum required tolerance. This problem however, has been solved in a unique manner as described in copending patent application Ser. No. 852,840, filed Aug. 25, 1969, and titled "Fast Settling, Stable Amplifier Circuit," now U.S. Pat. No. 3,577,090.

3. Finally, Loofbourrow gain-ranges in multiples of 8. That is, each stage in the instantaneous gain-ranger has a constant gain of 8; and, as the output of the amplifier system switches from one amplifier stage to another, the total amplification changes by factors of 8. This is undesirable because it reduces the resolution of the entire amplifier system. If the output of the amplifier is to be digitized, as is the usual case, a gain of eight is equal to three binary bits. Thus, in an analog-to-digital (A/D) converter, the voltage level would have to drop three bits below full scale before the gain-ranging amplifier would uprange and bring the input to the A/D converter back to full scale. The resolution of the A/D converter is therefore reduced by three bits.

Thus, it is an object of this invention to provide an instantaneous gain-ranging amplifier with improved resolution.

It is another object of this invention to provide an instantaneous gain-ranging amplifier with DC-coupled stages that may react instantaneously to changes in the amplifier condition.

Finally, it is an object of this invention to provide premultiplexer amplification so as to mask the multiplexer and wide-band amplifier noise.

SUMMARY OF THE INVENTION

The objective of providing premultiplexer amplification to mask the multiplexer and wide-band amplifier noise is achieved in the copending application by a system that utilizes a slow, low noise premultiplexer gain-ranging amplifier in each channel and a single high-speed, higher noise level multiplexer to connect each channel, taken at the output of the premultiplexer gain-ranger, sequentially to an instantaneous gain-ranging amplifier to provide the remainder of the needed gain.

Although this system is a substantial improvement over the prior art, it has been found possible to improve upon it by a different system that is both smaller and cheaper.

This is achieved in the present invention by a system that uses two levels of multiplexing. A first set of multiplexer gain-ranging stages are provided that multiplex some fraction of the input channels and also supply gain. The output of the multiplexer gain-ranging stages are then time shared with the instantaneous gain-ranging stage by a second high speed, high level multiplexer. Since the second, high level multiplexer samples the multiplexer gain-rangers sequentially, there is relatively long time between samplings. This time may be used by the multiplexer gain-ranger to step to another input channel, adjust the amplifier gain, and allow for the noise generated thereby to disappear before being sampled again by the high level multiplexer. This approach eliminates the need for a premultiplexer gain-ranging amplifier stage in each channel.

For completeness and clarity, the discussion of the system of the copending application will be repeated. The new system is discussed in connection with FIGS. 10–13.

DESCRIPTION OF THE PREFERRED EMBODIMENTS

Figure 1:
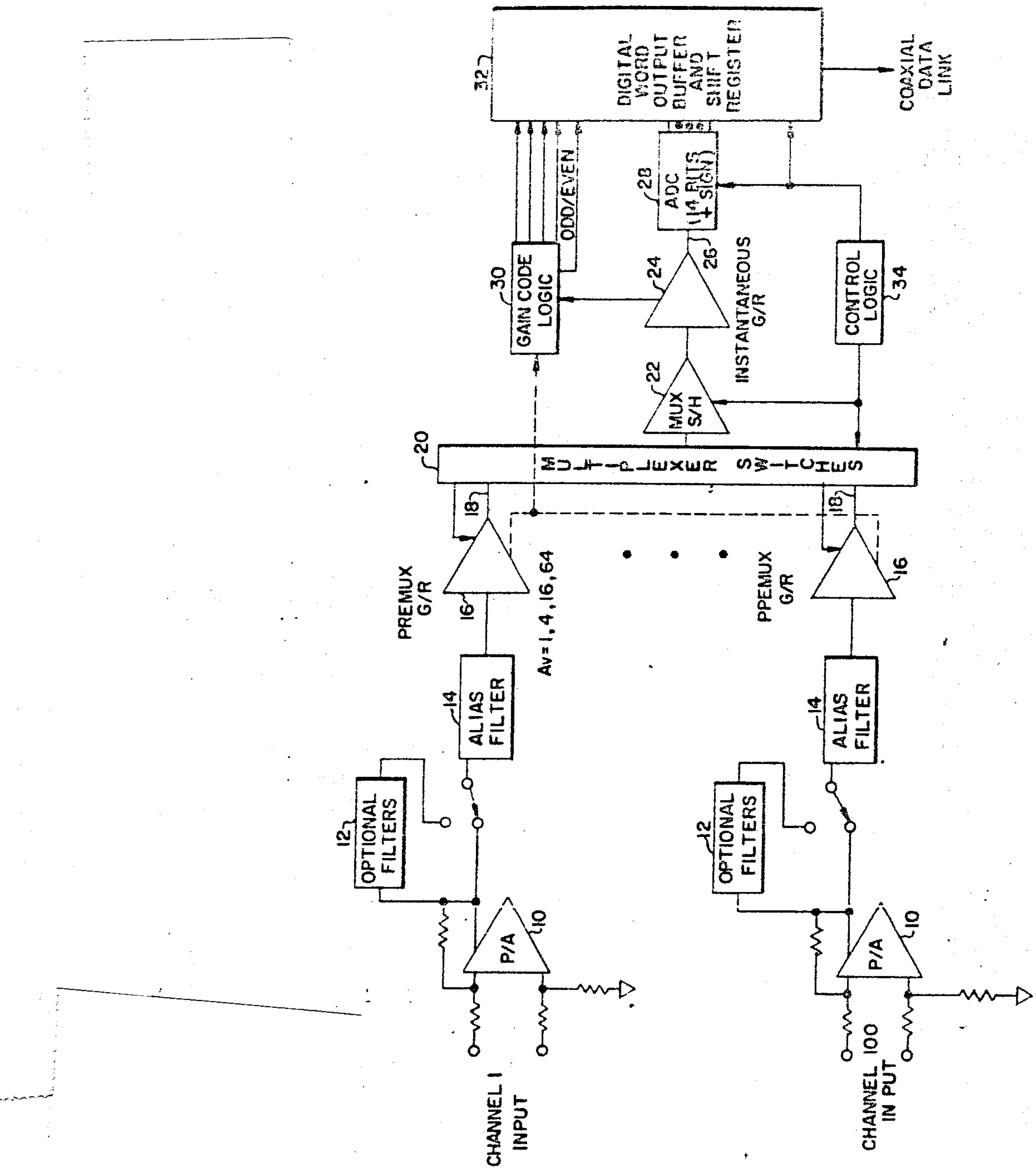
FIG. 1 is a block diagram of a multi-channel, instantaneous gain-ranging amplifier system.

FIG. 1 is a block diagram showing the organization of the entire amplifier system. Generally, the system consists of individual channels (for the sake of simplicity, a 100-channel system will be discussed herein) feeding into a multiplexer. Each channel has a preamplifier, a filtering means and a premultiplexer gain-ranging amplifier. A 100-point multiplexer sequentially connects each channel to a sample-and-hold circuit. An instantaneous gain-ranging amplifier is connected to the output of the sample-and-hold circuit that determines the correct gain for each sample and presents an amplified output signal to a 15-bit analog-to-digital converter. The instantaneous gain-ranger also generates a four-bit digital word representing its gain state. During the sample time, a gain code logic circuit sums the gains from the premultiplexer gain-ranging amplifier of the channel being sampled and the instantaneous gain-ranging amplifier and delivers an output word representing the total system gain. A four-bit gain code and a 15-bit digital word are then transmitted serially over a coaxial data link for further processing. In a seismic prospecting application, each channel would be connected to the output of a geophone or a group of geophones, and the amplified output of the amplifier system would be recorded for further seismic data processing.

More specifically, on the front end of each channel is a preamplifier 10. Preamplifier 10 has a transformerless differential input that introduces very little distortion into the signal. The dynamic range is 136 db at a 2-millisecond sampling rate and can accommodate input signals of 1 volt peak without clipping. The differential input impedance is approximately 1,000 ohms and the voltage gain is 20 db. As previously mentioned, a preamplifier stage at this point is absolutely essential to boost the signal above the noise introduced by either the wide-band amplifiers of the instantaneous gain-ranger or, in the case of a multiplexed system, to aid in boosting the signal above the noise introduced by the multiplexer. The UA7090 amplifier manufactured by Fairchild has been successfully used for the preamplifier function.

Optional filters 12 include a high and low pass filter and a 60 Hz notch filter. The 3 db cutoff frequencies for the high and low pass filters are 7 and 55, respectively, with optional settings of 15 and 70 respectively.

Anti-alias filters 14 are included in each channel to eliminate spurious signals that would be generated as the analog-to-digital converter sampled high frequency components of the input signal. In a system where an analog signal is to be converted to a digital representation thereof, the analog signal is sampled preferably at several points within one wave length, and each sample is then converted to a digital number. In this process, however, input signals that have a frequency greater than half of the sampling frequency (often called the Nyquist frequency) appear as a difference frequency, an alias. Thus, for example if the sampling frequency were 500 cycles per second, a 450 Hz component of the input signal would be transformed into a 50 Hz signal (500 Hz − 450 Hz). Thus, a spurious signal in the seismic band would appear. To avoid this problem, all frequency components of the input signal above the Nyquist frequency must be eliminated. Although design considerations may vary widely on the anti-alias filter and many designs are known in the art, if the filter output is 72 db or greater below the input for signal frequencies above the Nyquist frequency, there will be no problems. Of course, if the amplifier system is designed to operate at different sampling frequencies, it would be desirable to have variable anti-alias filters.

The output of each anti-alias filter 14 is connected to a premultiplexer gain-ranging amplifier 16. Functionally, the premultiplexer gain-ranger must add sufficient gain to the signal in each respective channel to mask the system noise introduced by the multiplexer, viz approximately 100 microvolts. The premultiplexer gain-ranging amplifier ranges between gains of 1, 4, 16, and 64, depending on the input signal level. When the absolute magnitude of the peak output signal of the premultiplexer gain-ranger drops below 1.2 volts, the amplifier gain will increase one step at the end of a channel select control signal. If the absolute magnitude of the peak output signal exceeds 8 volts, the amplifier gain will decrease one step immediately, provided that the channel is not presently selected by the multiplexer, in which case the gain will decrease by one step as the multiplexer moves to the next channel. A more detailed discussion of the premultiplexer gain-ranger will be given in connection with FIGS. 3 and 4.

Multiplexer 20 has the function of sequentially connecting output 18 of premultiplexer gain-ranger 16 to the multiplexer sample-and-hold circuit 22 (s/h). Since multiplexers are well known in the electronics art, no further discussion will be given to this particular component other than to say that several commercial units would be satisfactory for the present multiplexer function.

The use of sample-and-hold circuit 22 was found necessary to avoid overload distortions that might otherwise occur in an instantaneous gain-ranging amplifier system due to changes in the input signal level during the sampling interval. Sample-and-hold circuits are well known in the electronics art and any one of a number of commercial units would be satisfactory for the present function.

The output of sample-and-hold circuit 22 is applied to the input of an instantaneous gain-ranging amplifier 24 that will be discussed in more detail in connection with FIG. 5. Instantaneous gain-ranger 24 operates to maintain its output 26 at or near full scale on analog to digital converter (ADC) 28. Instantaneous gain-ranger 24 is designed to settle to within 0.01 percent of its final value in a few microseconds. Thus it is able to respond to virtually all variations of signal input so that no information is lost due to amplifier distortions. Also resolution is maintained at its maximum since the output signal 26 into the analog to digital converter is maintained at or near full scale. The amount of gain supplied by gain-ranger 24 is transmitted as a digital word to gain code logic unit 30 where it is combined with the gain code information coming from premultiplexer gain-ranger 16. The output of gain code logic unit 30 is a four-bit digital word indicating the total amount of gain supplied by the entire amplifier system for each digital output word generated by the analog to digital converter.

For analog to digital converter 28, a 14-bit plus sign conventional unit, well known in the electronic art, may be used. The output of analog to digital converter 28 is a 15-bit word that gives the sign and magnitude of the sample as it appears at the output 26 of instantaneous gain-ranger 24. The amount of gain that a given sample has received is indicated by the four-bit output word of gain code logic device 30. The gain code word and ADC output word may then be recorded on magnetic tape or the like for further processing. Or an output buffer and shift register 32 may be used to temporarily store the data before it is transmitted via a data link to some remote storage medium.

Control logic unit 34 contains a clock and timing circuits for synchronizing the system. The control function is achieved in a conventional way and is not part of this invention.

Figure 2:
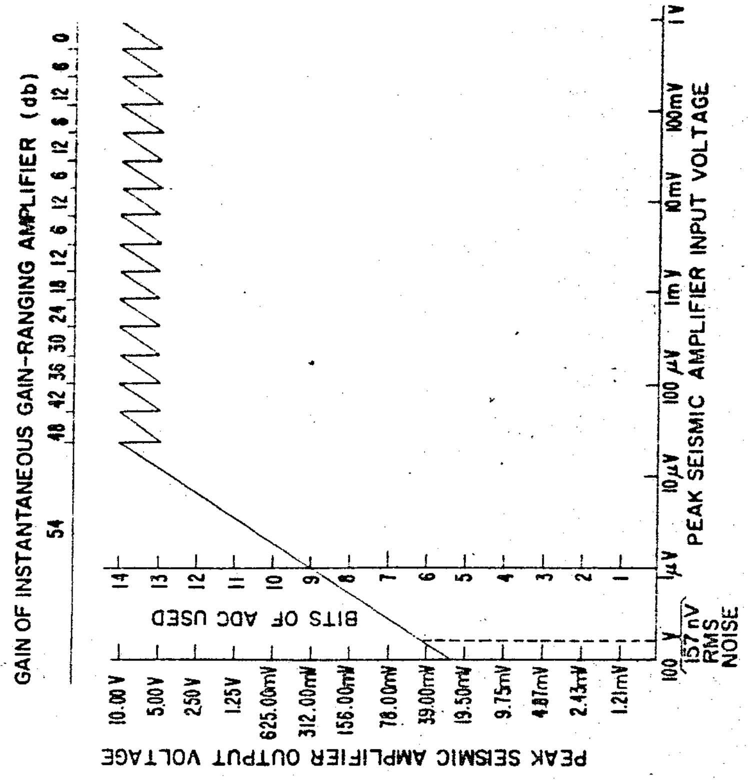
FIG. 2 is a transfer characteristic of the total amplifier system.

FIG. 2 shows the transfer characteristic for the total amplifier system. On the vertical axis two scales are shown. One is the peak seismic amplifier output voltage and the other illustrates the number of bits of ADC 28 that are used. The bottom horizontal scale represents peak input voltage to the amplifier system. The horizontal scale at the top shows the gain being supplied to the system by the instantaneous gain-ranging amplifier for a given input voltage. From this graph it can be seen that the amplifier system maintains its output within one-bit of full scale for input voltages greater than 10 microvolts. Thus the resolution of the system is extremely good.

Figure 3:
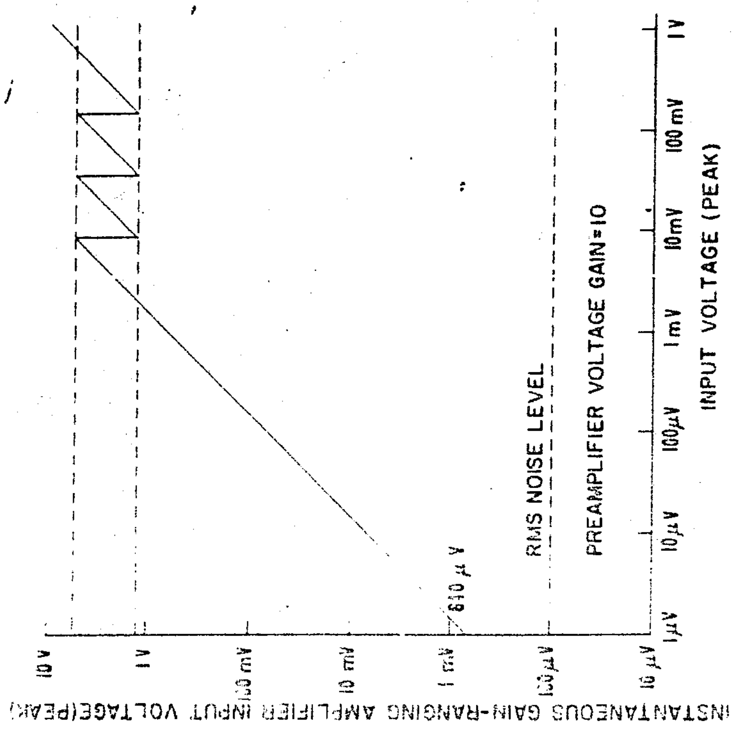
FIG. 3 is a transfer characteristic of the amplifier system ahead of the multiplexer.

FIG. 3 illustrates the operation of the premultiplexer gain-ranging amplifier. Again the input voltage to the premultiplexer gain-ranger is on the horizontal scale while the output to the instantaneous gain ranger is on the vertical scale. The horizontal scale runs from 1 microvolt to 1 volt and because the preamplifier has an amplification factor of 10 the vertical scale runs from 10 microvolts to 10 volts. The RMS noise level of multiplexer 20 is shown by the dotted line at 100 microvolts. As can be seen, the noise is maintained substantially below the signal level presented to the instantaneous gain-ranging amplifier 24 for all values of the input signal above 1 microvolt. For input voltages above approximately one millivolt the multiplexer noise is maintained 80 db below the output signal level.

Figure 4:
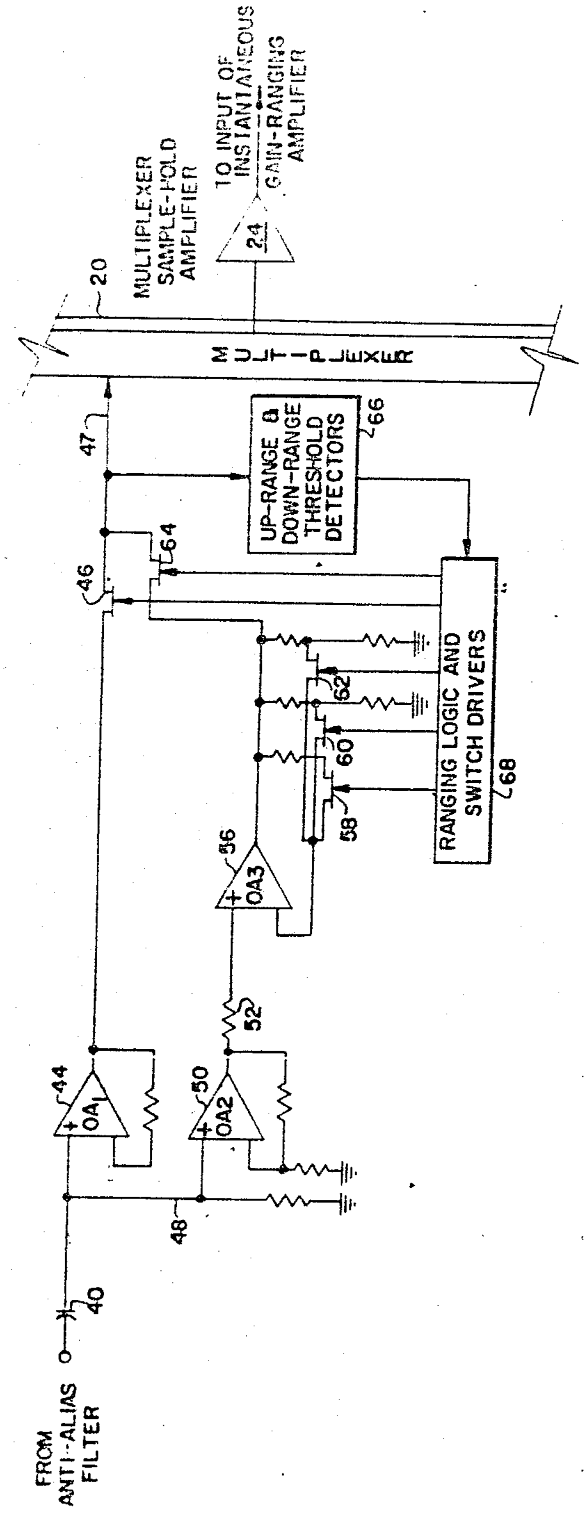
FIG. 4 is a block diagram of the premultiplexer gain-ranging amplifier.

FIG. 4 is a diagram of the premultiplexer gain-ranging amplifier. The input signal taken from the anti-alias filter passes through a capacitor 40 to the noninverting input of operational amplifier 44 which provides a low drift, fixed gain of unity. The output of operational amplifier 44 is taken through FET switch 46 to one input of multiplexer 20. The signal from the anti-alias filter is also supplied via lead 48 to the noninverting input of operational amplifier 50. The feedback resistors connected to input and output terminals of operational amplifier 50 cause it to have a fixed gain of 4. Its output is taken through resistor 52 to the noninverting input of operational amplifier 56. In the feedback loop of operational amplifier 56 are FET switches 58, 60, and 62. Depending on which of the three FET switches 58, 60, and 62 are activated, the gain of amplifier 56 takes on the value of 1, 4, or 16. And the output of amplifier 56 is connected to the output of the premultiplexer gain-ranging circuit via FET switch 64. Also connected to output 47 are the upranging and downranging threshold detectors 66. Detectors 66 are conventional circuits, commercially available, that detect whether output 47 exceeds 8 volts or drops below 1.2 volts. The output therefrom indicating the level of output 47 as described, is transmitted to the ranging logic and switch driver circuitry 68. The function of this circuitry is, upon receiving a signal from threshold detector 66, to determine which of switches 46, 58, 60, 62 or 64 should be closed to maintain output 47 between 1.2 volts and 8 volts.

Figure 5:
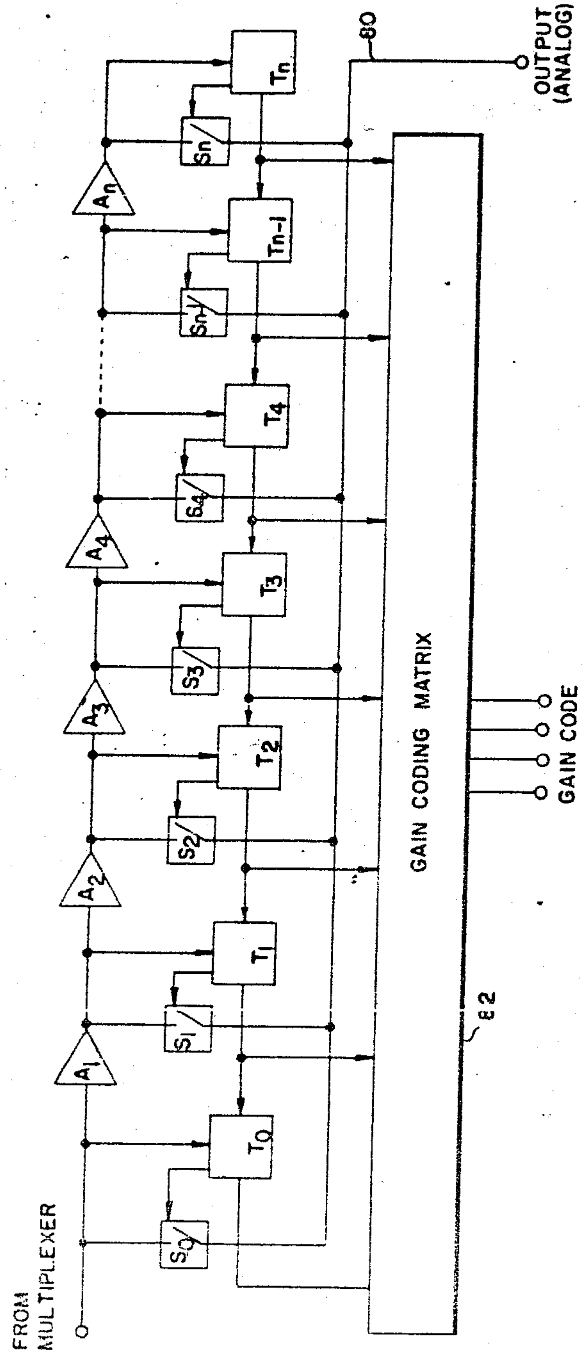
FIG. 5 is a block diagram of the instantaneous gain-ranging amplifier.

FIG. 5 illustrates the basic approach to the instantaneous gain-ranging amplifier 24. It consists of a plurality of gain stages $A_1$ through $A_n$ having a precision gain of 6 db. Connected to the output of each precision gain stage $A_1$ through $A_n$ are output switches $S_0$ through $S_n$. The switches are fast, electronic single pole, single throw FET switches. Switches, $S_1$ through $S_n$ respectively connect the output of precision gain stages $A_1$ through $A_n$ to an output bus 80. The switch $S_0$ connects the input to amplifier $A_1$ with output bus 80. Threshold sensing and logic circuits $T_1$ through $T_n$ respectively sense the output of amplifiers $A_1$ through $A_n$ while threshold and logic circuit $T_0$ detects the threshold of the input to amplifier $A_1$. The output of the threshold portion of circuits $T_0$ through $T_n$ is true when the threshold is exceeded in either the positive or negative direction.

Each threshold circuit is provided with an output connection to both its respective logic circuit and the logic circuit of the next preceding stage. Each logic circuit is provided with an output connection to its respective switching circuit. The switching equation indicating which of the switches $S_0$ through $S_n$ will be closed is $$S_k = \overline{X}_k X_{k+1} \quad (1)$$

where $X_k$ is the binary variable representing the output of the Kth threshold circuit. From Equation 1 it can be seen that the first amplifier in the chain whose output does not exceed the threshold value will be connected to analog output bus 80. This insures that the output signal remains between 5 and 10 volts until the gain-ranging capability has been exhausted. The information for determining which stage in the instantaneous gain-ranger is connected to the output bus and consequently the total gain of the instantaneous gain-ranging amplifier is supplied by circuits $T_0$ through $T_n$ to a gain coding matrix 82. The output of gain coding matrix 82 is a four-bit digital word representing the total gain of the instantaneous gain-ranging amplifier. The four-bit gain code word is then transmitted to summing networks, not shown in FIG. 5, where it is combined with the gain information supplied from the premultiplexer gain-ranging amplifiers to form a single digital word representing the total gain of the amplifier system. This word is then combined with the digital output of the ADC 28. Thus for each sampled input there is a digital output word consisting of a first part indicating the total amplification supplied by the amplifier system and a second part indicating the normalized value of the magnitude of the sample.

Figure 6:
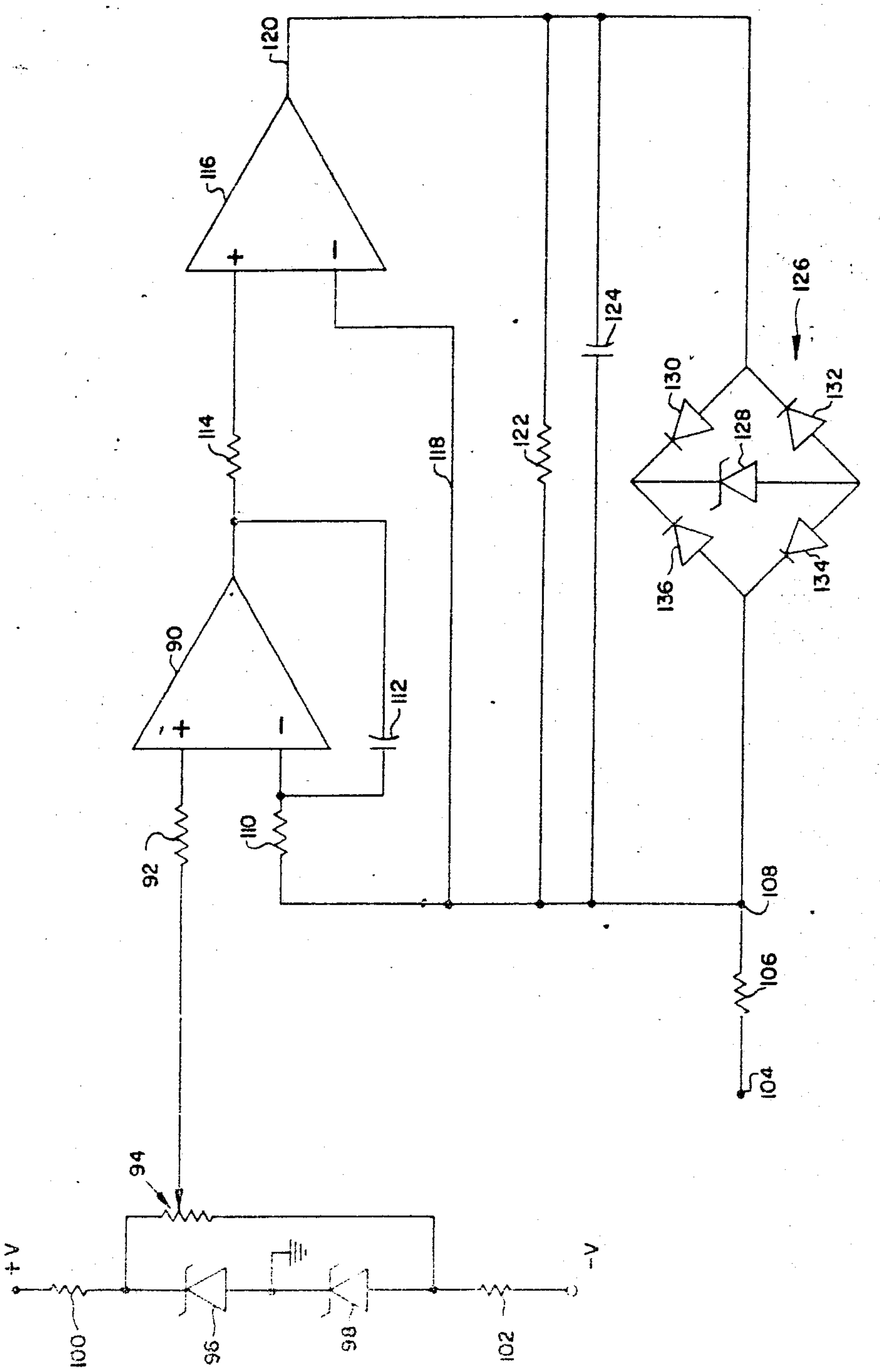
FIG. 6 is a circuit diagram of one stage of the instantaneous gain-ranging amplifier.

FIG. 6 shows a typical gain stage, $A_k$, of the instantaneous gain-ranging amplifier 24. Each stage consists of an amplifier circuit having two operational amplifiers in cascade with a feedback network connecting the output of the circuit to the input. Operational amplifier 90 is a very low drift, low frequency device. Nominally an amplifier with a drift characteristic as low as 2 microvolts per degree is desirable. The noninverting input of operational amplifier 90 is connected through resistor 92 to a rheostat 94. Rheostat 94 is part of an offset control circuit consisting of Zener diodes 96 and 98 with the common point between them grounded, resistors 100 and 102 and a positive and negative power supply. Typically the power supplies may be 15 volts and the Zener have a break down voltage of 5 volts. The function of the offset control portion of the circuit is to supply a very steady dc voltage to the noninverting input of amplifier 90.

The input to the amplifier gain stage is indicated by reference numeral 104. Impedance 106 is the input impedance and point 108 is a virtual ground or summing point. Between summing point 108 and the inverting input to amplifier 90 is connected a resistor 110. The function of capacitor 112 is to take operational amplifier 90 out of the circuit as soon as possible at frequencies above dc since amplifier 90 is only of interest at dc where it essentially controls the drift of the entire two amplifier circuit combination as will be demonstrated later. For this purpose a 1 micro farad capacitor has been used to advantage.

The output of amplifier 90 is then supplied via resistor 114 to the non-inverting input of a second operational amplifier 116. Operational amplifier 116 may have a poor drift characteristic but should have a very fast response characteristic. For example, an amplifier having a 0.01 percent settling within 1 microsecond has been found desirable. The inverting input to amplifier 116 is also connected via lead 118 to summing junction 108. Output 120 of operational amplifier 116 which is also the output of the entire gain stage, is fed back to the inverting input of operational amplifier 90 via the parallel combination of resistor 122 and capacitor 124. The function of capacitor 124 is to avoid ringing in the circuit, and for such purposes a 10 picro farad capacitor has been found sufficient. Also connected between the output 120 and summing junction 108 is a clipping circuit 126 consisting of a Zener diode 128 and 4 diodes 130, 132, 134, and 136. Clipping circuit 136 operates to limit the input signal so as to avoid saturation of the amplifier gain stage. The four diodes are so arranged that a single Zener will break down with either a positive or a negative signal.

If the output of amplifier 116 drifts by some small amount, say 100 microvolts, the offset voltage then is applied to the input of amplifier 90 through feedback impedance 122. The polarity of the output signal from amplifier 116 is such that the feedback signal reaching amplifier 90 will tend to force the circuit to compensate for the drift. For example, if a positive offset appears at the output of amplifier 116, it is transmitted back through feedback resistor 122 and resistor 110 to the negative input of amplifier 90. Since amplifier 90 is a very stable amplifier its output will not have drifted. The 100 microvolt offset will appear across the input terminals of amplifier 90 and a large negative signal equal to 100 microvolts times the open-loop gain of amplifier 90 will immediately be supplied to the positive input of amplifier 116. The signal appearing at the output of amplifier 90 will be negative, and when applied to the positive input of amplifier 116, will tend to drive that amplifier output in a negative direction and thus compensate for the positive offset due to drift. The effect then of amplifier 90 is to reduce the offset of the total gain stage system by the gain of amplifier 90.

However at high frequencies, the effect of capacitor 112 becomes significant; and amplifier 90 is well out of the circuit at sampling frequencies.

Figure 7:
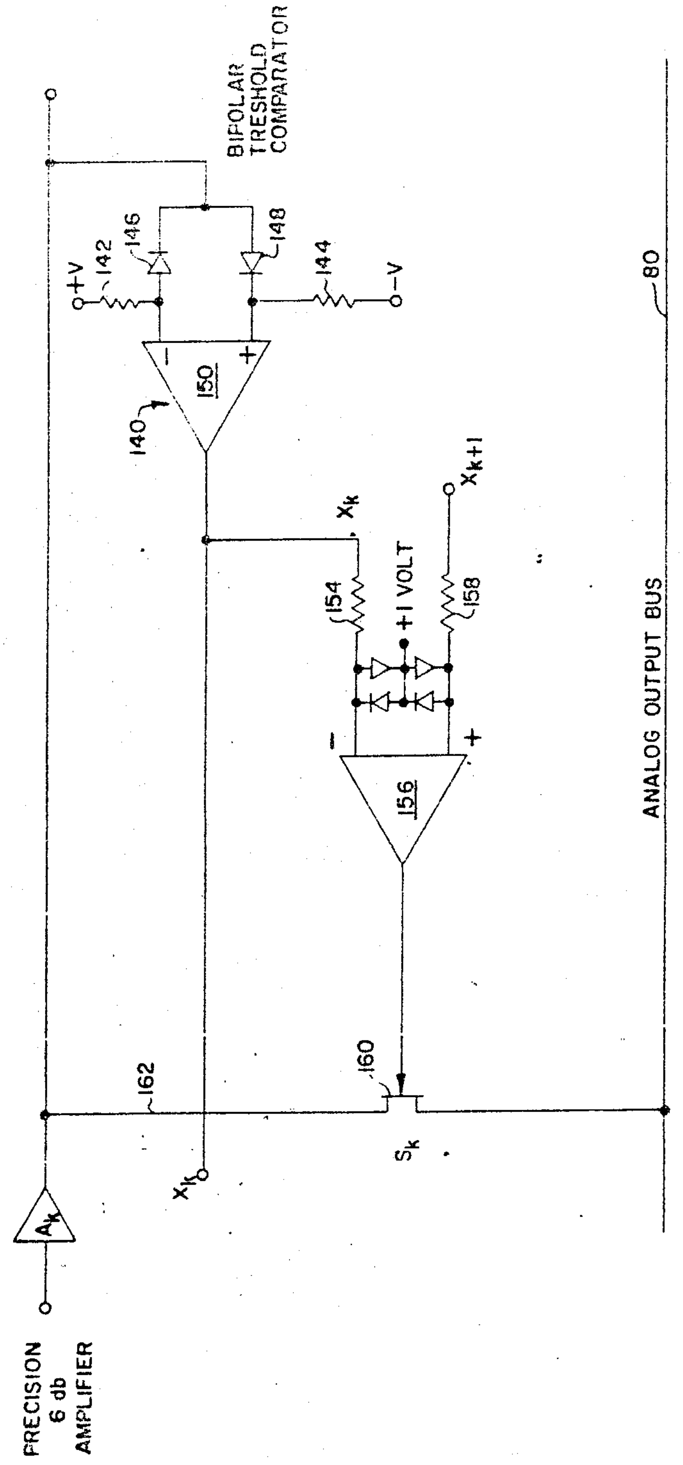
FIG. 7 is a circuit diagram illustrating one embodiment of a threshold comparator and switching logic.

FIG. 7 illustrates a threshold detector and logic switching scheme that may be used with the instantaneous gain-ranging amplifier. In accordance with the above discussion, the amplifiers $A_1$ through $A_n$ each include both amplifiers 90 and 116 of FIG. 6. In FIG. 7 the output of the Kth amplifier, $A_k$, is detected by a bipolar threshold comparator circuit 140 consisting of a positive source of voltage, a resistor 142, a negative source of voltage, resistor 144, diodes 146 and 148 and operational amplifier 150. The voltage supplies and diodes 146 and 148 operate to clamp the inputs to operational 150 a predetermined voltage level.

The polarities and amplitudes of the voltage supplies are such that the output of operational amplifier 150 will be strongly negative so long as the input signal has a peak amplitude, either positive or negative, of less than some pre-determined peak value, viz 8 volts. For example, suppose that the positive and negative inputs to amplifier 150 were clamped at 8 volts. If the input signal were 0, the negative terminal would be positive with respect to the positive terminal and a negative signal would consequently appear at the output terminal of amplifier 150. The output of amplifier 150 is supplied via resistor 154 to the negative input of operational amplifier 156. When the output of operational amplifier 150 is negative, a negative signal is supplied to the negative terminal of operational amplifier 156 (the inverting input) and a positive signal is consequently supplied from the output of operational amplifier 156 to the gate of field effect transistor 160. The arrow on the gate of field effect transistor 160 indicates that the transistor is turned on by a positive signal. Thus when the output of amplifier of stage $A_k$ has an absolute peak value less than the threshold value controlled by circuit 140, field effect transistor 160 is turned on and the output of amplifier $A_k$ is connected through the 162 to the analog output bus 80.

If the output of the $A_k$ amplifier exceeds the threshold value as determined by circuit 140, the positive terminal to amplifier 150 will be positive with respect to the negative input terminal so that operational amplifier 150 will supply a positive output signal period. A positive output signal transmitted to the negative (or inverting input) of amplifier 156 will be inverted thereby so that a negative signal will be supplied to the gate of field effect transistor 160. Since a negative signal will not turn on field effect transistor 160, the output of operational amplifier stage $A_k$ will not be connected to analog output 80

The positive or non-inverting input to amplifier 156 is connected to the output logic of the A+1 amplifier stage. Since that stage will be limiting, the $X_k+1$ signal will be positive. This signal will however be limited to +1 volt by the diodes connected between the inputs to operational amplifier 156. This ensures that the inverting terminal will be negative with respect to the positive terminal and that the output will therefore be positive.

If the $A_k+1$ stage is not limiting however, then both inputs to amplifier 156 will be negative. However, the voltage drops across the diodes are such as to insure that the signal on the positive terminal is more negative than the signal on the negative terminal. This condition ensures that the output of operational amplifier 166 will be negative and consequently that field effect transistor 160 will remain non-conducting.

The output of operational amplifier 150 is the binary variable, $X_k$. The presence of a signal, $X_k$, on the output indicates that the output of $A_k$ exceeds the threshold value or in other words that amplifier $A_k$ is limiting.

The input to the amplifier 156 is connected through resistor 158 to the logical output from the preceding stage, $X_{k+1}$. The output of AND-gate 156 is then the logical product of $\bar{X}_k$ and $X_{k+1}$. The output of operational amplifier 156 actuates the gate of field-effect transistor 160. And when operational amplifier 160 is switched into the conducting mode, the output of $A_k$ will be transmitted via lead 162 to analog output bus 80.

Since amplifiers $A_1$ through $A_n$ are connected in the inverting mode, the output of all odd numbered amplifiers will be negative while the output of all even numbered amplifiers will be positive. This polarity difference must of course be accounted for if the amplifier system is to operate properly. If the even/odd distinction were not accounted for, one could be certain of the absolute magnitude of the amplifier output but not the polarity since one would not be certain whether an even or odd stage of the amplifier were connected to the output.

Figures 8, 8A:
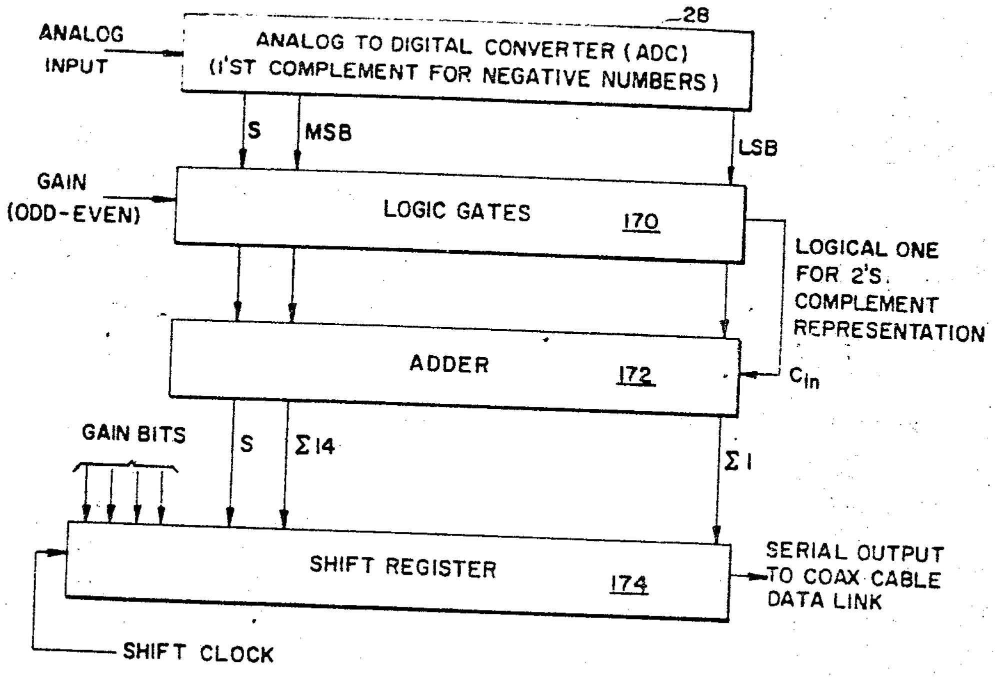
FIG. 8 is a diagram illustrating the digital polarity correction scheme with a table of values in FIG. 8A.
Figure 9:
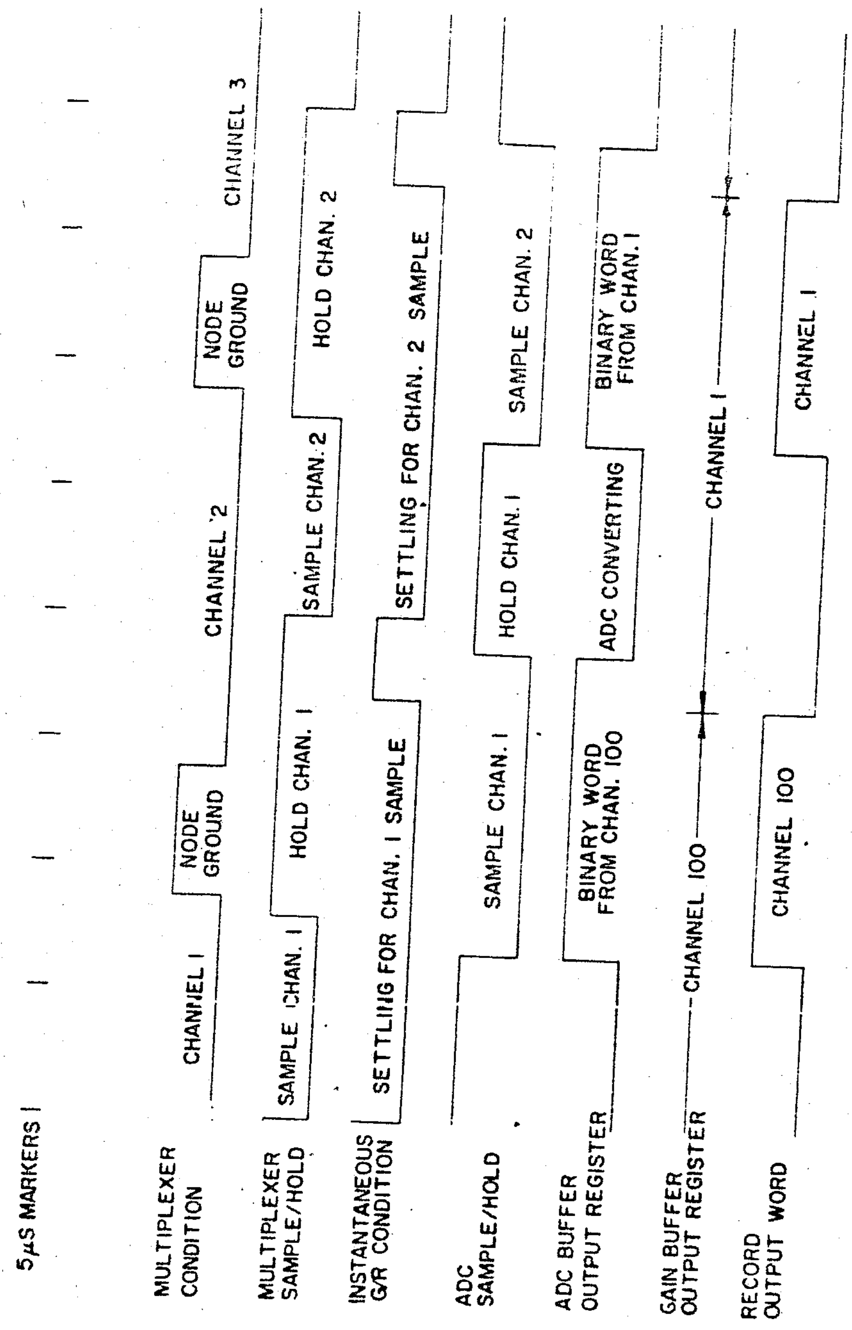
FIG. 9 is a timing chart for a one hundred channel instantaneous gain-ranging system sampled every two milliseconds.

The problem is solved in a very simple and unique manner by logic circuitry contained in buffer 32. As can be seen from FIG. 1, a signal is supplied from gain code logic 30 to buffer 32 indicating whether or not an odd or even stage is connected to the output of the amplifier. The digital correction scheme is shown in FIG. 8. The output of instantaneous gain-ranging amplifier 26 is supplied to the input of analog to digital converter 28. In accordance with conventional practice, negative numbers are represented in one's compliment, and the sign bit is O for positive numbers, 1 for negative numbers. The output of the analog to digital converter, consisting of 14 bits plus a sign bit are supplied to logic gates 17. Also supplied to the logic gates is the signal from gain code logic 30 indicating whether an even or odd stage of the instantaneous gain-ranging amplifier is connected to the amplifier output. As can be seen by the table associated with FIG. 8, if the signal polarity is positive and the gain is even, the output of the analog divisional converter is correct. If the signal polarity is positive and the gain is odd, the output of the analog to digital converter is incorrect and can be changed by complementing. Thus, logic gates 170 detect whether the gain stage is even or odd and whether the signal polarity is even or odd, and complement the output of the analog to digital converter when the signal polarity is positive and the gain stage is odd.

The same procedure is carried forward when the signal polarities are negative. Thus, if the gain stage is even, the output of the analog to digital converter is correct. If the gain stage is odd, the output of the analog converter is complemented.

If it is desired to have the negative numbers in two's complement, a one must be added to the least significant digit of the one's complement. To achieve this objective, an adder circuit 172 is supplied. In this case, a one would be added in the least significant digit to the one's complement number supplied by logic gates 170. The output of adder circuits 172 is then supplied along with the gain bits from gain code logic unit 30 to a shift register 174. The repetition rate of the shift clock for shift register 174 is such that the shift register can accept the 19 bits of digital information in parallel form and serially supply them to an output coaxial data link. Obviously, if two's complement representation is unnecessary, adder 172 would also be unnecessary.

Figure 10:
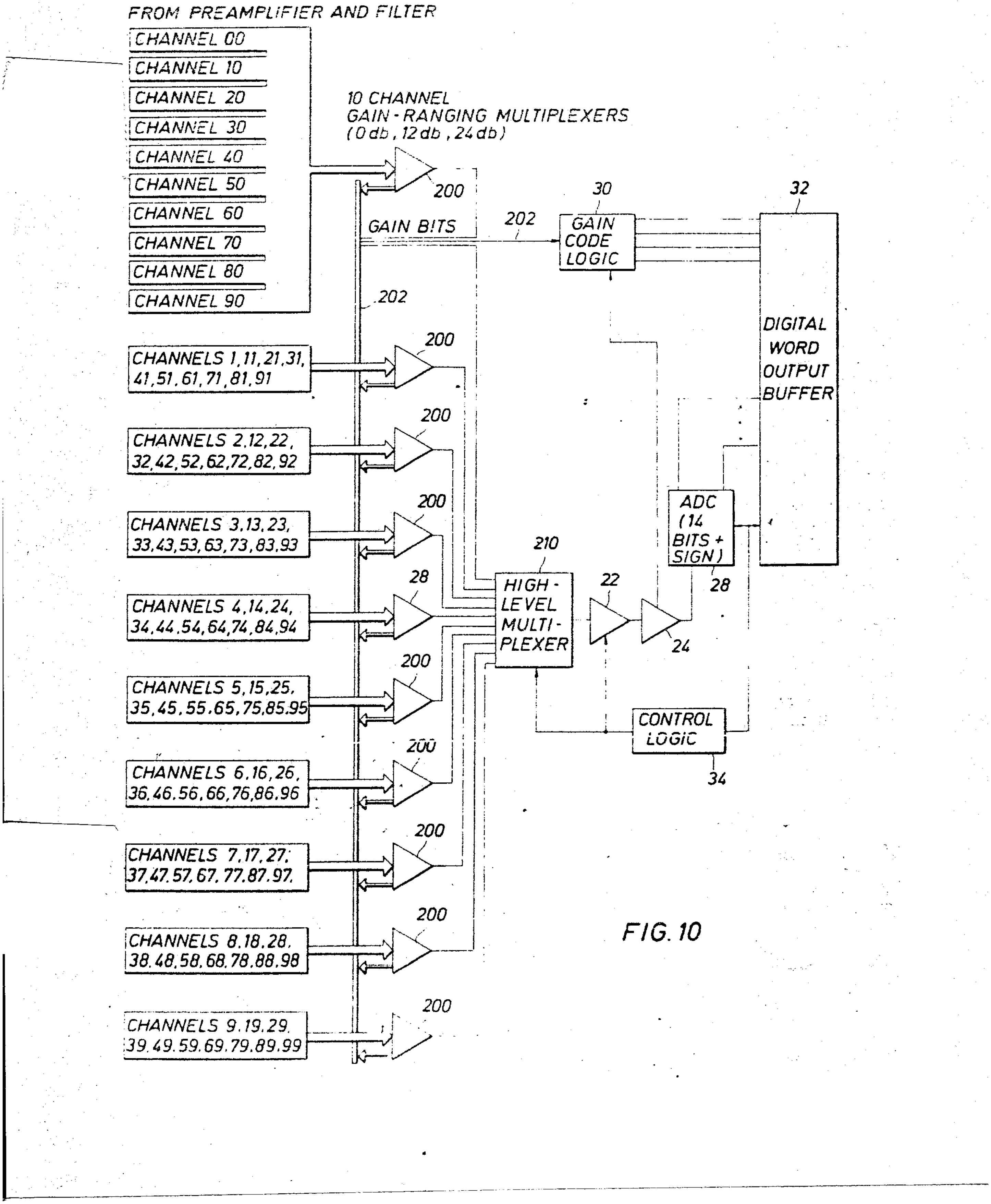
FIG. 10 is a block diagram of the preferred system.

FIG. 10 is a block diagram showing the organization of the present invention. Again a 100-channel system is illustrated as an example although the concepts of the invention would apply to a system with any number of channels. Referring now to FIG. 10, a gain-ranging multiplexer 200 is provided for each 10 input channels (taken at the filter output).

Each of the 10 gain-ranging multiplexers performs the multiplexing function and supplies part of the gain-ranging amplification for 10 input channels. The gain-ranging multiplexer input channels are spaced 10 seismic input channels apart. That is, a typical gain-ranging multiplexer will service channels 00, 10, 20, 30, 40, 50, 60, 70, 80 and 90, as illustrated in FIG. 10. This arrangement allows each gain-ranging multiplexer 90 microseconds in which to settle and a 10 microsecond sampling time. In this embodiment the premultiplexer gain-ranging amplifier 16 has been eliminated and replaced by gain-ranging multiplexers 200. Functionally, gain-ranging multiplexers 200 must add sufficient gain to the signal in each channel to mask the system noise introduced by high speed multiplexer 210. Since the multiplexing repetition rate for the multiplexer 200 may be a factor of 10 slower than that for multiplexer 210, the noise introduced into the system by the gain-ranging multiplexers 200 is relatively small and ample settling time is available. The gain state of each gain-ranging multiplexer is supplied via lead 202 to gain code logic device 30. The remainder of the devices in FIG. 10 are the same as those illustrated in FIG. 1 and will not be further elaborated upon here.

In the preferred embodiment of FIG. 10, part of the multiplexing function is performed by the relatively low speed, low noise multiplexers incorporated in the gain-ranging multiplexers 200. The rest of the multiplexing function is performed by high level multiplexer 210 which sequentially connects the output of gain-ranging multiplexers 200 to multiplexer sample-and-hold circuit 24.

Figure 11:
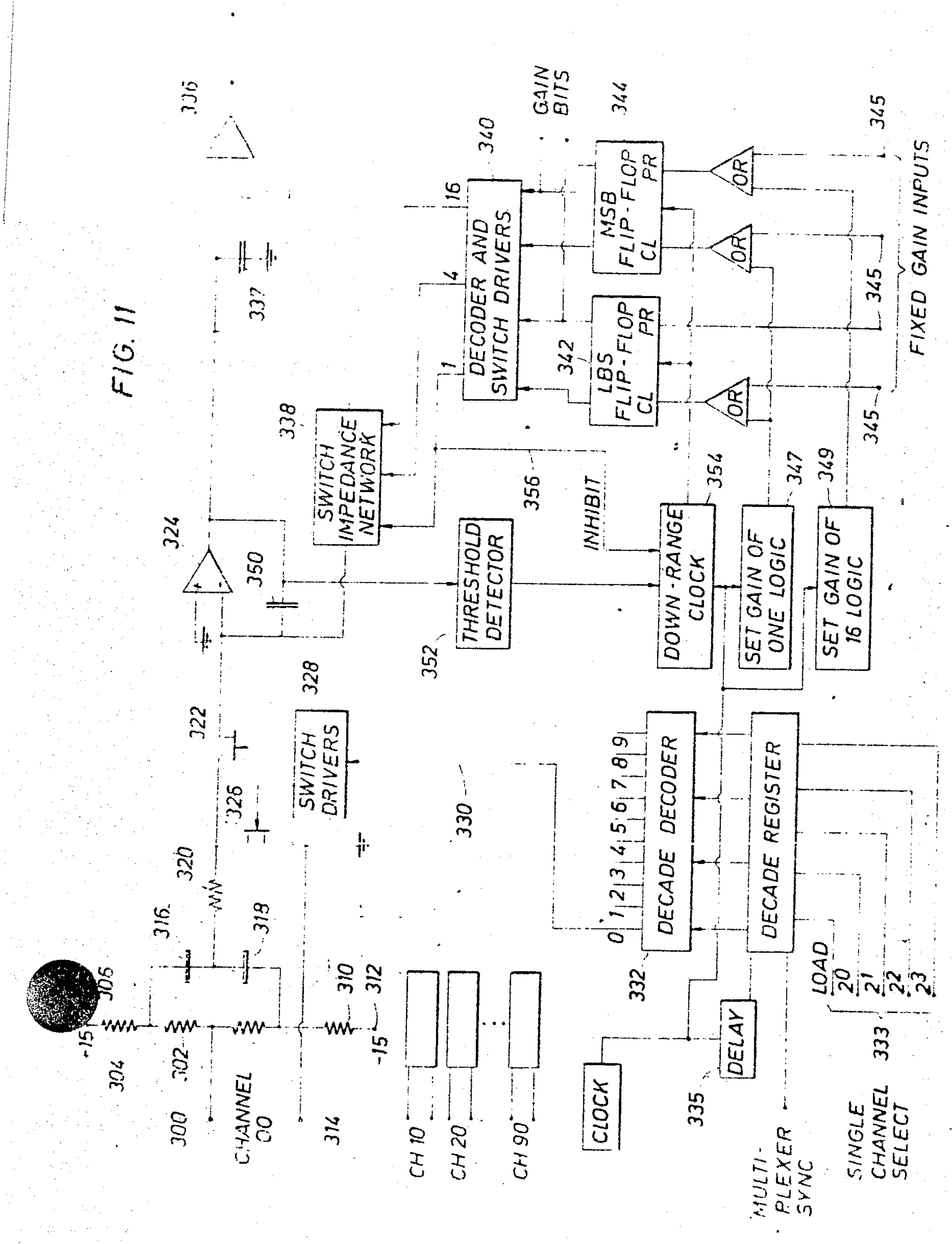
FIG. 11 is a combination circuit and block diagram of the gain-ranging multiplexer.

FIG. 11 is a more detailed diagram of a gain-ranging multiplexer 200. Ten analog signal input channels numbered 00-90 are each capacitively coupled into the circuit. Because of the very high gains of the amplifier system, even a very small dc offset current at this point would saturate the system. Thus, a capacitively coupled input is important. However, it is also important to keep the ac input impedance at as low a level as possible. These objectives are achieved by the input in configuration as shown. Resistors 302 and 304 connect high input 300 to a positive power supply 306. Resistors 308 and 310 connect input 300 with negative power supply 310. Typically the resistors 302 and 308 may have values of 100 ohms and resistors 304 and 310 may have values of 2,000 ohms. Low input 314 is grounded. A pair of electrolytic capacitors 316 and 318 have one common terminal and their other terminals connected to the node between resistors 302 and 304 and the node between resistors 308 and 310, respectively. Electrolytic capacitors may be made with large values of capacitance, but they also have a large leakage current. When connected as shown in FIG. 11, the dc leakage currents of capacitors 316 and 318 tend to flow between each other and the power supplies. But for ac signals, capacitors 316 and 318 are connected in parallel and consequently provide twice the capacitance of a single input capacitor.

A resistor 320 and a field-effect transistor switch 322 are connected between the common terminal of electrolytic capacitors 316 and 318 and the inverting input to operational amplifier 324. A second field-effect transistor switch 326 is connected between the common node of resistor 320 and transistor 322 and ground. The gates of switching transistors 322 and 326 are connected to switch drivers 328 which are in turn connected via lead 330 to decade decoder 332. Switching transistors 322 and 326 perform the multiplexer switching action by connecting or disconnecting input 300 to amplifier 324.

To connect input 300 to amplifier 324, switching transistor 322 is turned on and switching transistor 326 is turned off. During the time that input 300 disconnected, switching transistor 322 is turned off and switching transistor 326 is turned on so that input 300 is tied to signal ground. The power for enabling switching transistors 322 and 326 is provided by switch drivers 328 in response to an enabling signal supplied from decade decoder 332 via lead 330. Decade decoder 332 is a conventional circuit capable of decoding a four-bit digital signal transmitted from decade register 334 into an enabling signal on one of ten output lines. In this example, only output channel 00 of decade decoder 330 is shown connected up to its respective switch drivers and switching transistors. However, in reality, each of the remaining nine output channels would be connected to its own respective switch drivers and switching transistors for each input channel. Thus, switching transistors 322 and 326, switch drivers 328, decade decoder 332 and decade register 334 perform the multiplexing function. Timing is supplied via the systems clock and multiplexer sync signal that forces decade register back to a 0 state on every tenth clock signal. The decade register then counts up to ten in response to clock signals applied by the systems clock via delay 335. (To be explained more fully later). The single channel select lines 333 may be used to lock onto a single channel for diagnostic purposes. This is achieved by setting up the appropriate signals on the input lines and pulsing the load line.

The gain-ranging amplifier portion of the circuit consists of operational amplifier 324 and operational amplifier 336 along with the associated circuitry for determining the gain thereof.

Amplifier 336 is a unity gain, non-inverting buffer amplifier and capacitor 337 acts as a high pass filter. Amplifier 324 can assume gains of 0, 12 or 24 db depending upon the state of switch and impedance network 338 connected in the feedback loop thereof. Since the gain of an operational amplifier is determined by the ratio of the impedance in the feedback loop to the input impedance, the gain of amplifier 324 is determined by the ratio of the resistance in switch and impedance network 338 to the input resistance consisting of resistor 320 and the on resistance of transistor 322 combined with the equivalent impedance of the input RC network. The resistance of switch and impedance network 338 is determined by the state of several transistor switches located therein. And the state of these switches are in turn determined by enabling signals from decoder and switch drivers 340. A least significant bit (LSB) flip-flop 324 and a most significant bit (MSB) flip-flop 344 supply the digital gain code to decoder and switch drivers 340 in accordance with the truth table illustrated in FIG. 12. The states of flip-flops 342 and 344 may either be set manually via fixed gain inputs 345 or via the set gain of one logic circuit 347 and the set gain of 16 logical circuit 349.

Capacitor 350 is connected in the feedback loop of operational amplifier 324, and functions to reduce the circuit noise.

Connected to the output of amplifier 324 is threshold detector 352. This is a conventional threshold detector device and supplies a logic 1 output if the output of amplifier 324 exceeds ±8 volts.

The output of threshold detector circuit 352 is connected to down range clock 354. A logic 1 output from threshold detector 352 starts down range clock 354 provided that the gain of amplifier 324 is not already 0 db. Down range clock 354 causes flip-flop 342 and 344 to move the gain code lower in steps until the output of down range threshold detector 352 is a logic 0 (that is when the output of operational amplifier 324 drops below ±8 volts) or until unity gain is reached. The down range clock 354 is inhibited during the last 10 microseconds of channel time to prevent ranging during the time that the signal is being sampled by the time shared gain-ranging amplifier.

Figures 12, 13:
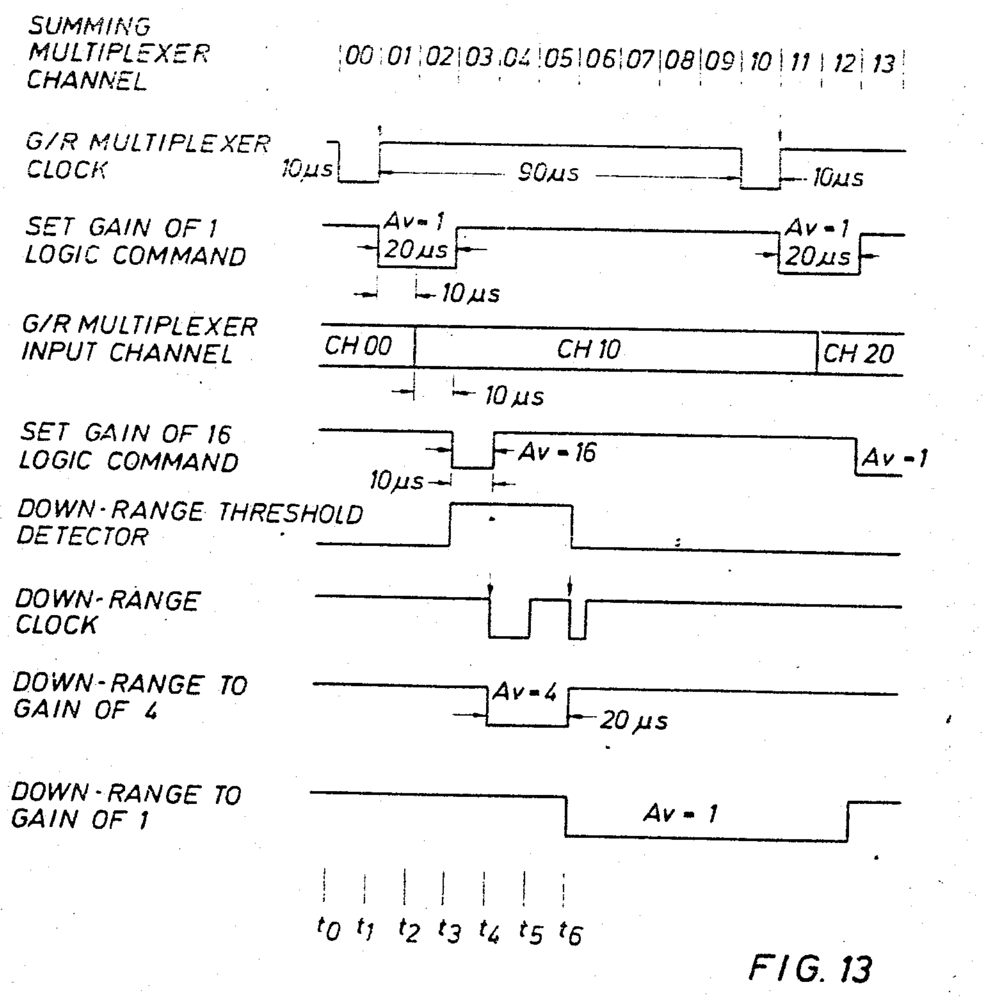
FIG. 12 is a truth table showing the relationship between the states of the gain setting flip-flops and the gain of the gain-ranging multiplexer.
FIG. 13 is a timing diagram for the gain-ranging multiplexer.

FIG. 13 is the timing diagram for the 10-channel gain-ranging multiplexer of FIG. 12. The timing diagram shows the coordination between summing multiplexer 210 and one of the gain-ranging multipliers 200, as well as the sequence of events that take place in that gain-ranging multiplexer. Referring now to FIG. 5, as the summing multiplexer 210 moves away from channel 00, the gain of the gain-ranging multiplexer is set to 1 at time $t_1$.

The gain of amplifier 324 is set to 1 by set gain of 1 logic circuit 347 to maximize the band width thereof so that internal noise generated by the switching operations can be absorbed through the amplifier rather than building up on the input capacitors. This essentially clears the system for the next channel. After 10 microseconds delay caused by delay circuit 335, decade register 334 steps the multiplexer circuitry to the next channel, in this case channel 10. This is at time T(2). Ten microseconds later at time T(3) the gain of amplifier 324 is set to 16 by set gain of 16 logic circuit 349. This forces the largest possible signal out of amplifier 324 and will cause the detection and logic circuitry to incrementally step the gain of amplifier 324 down until it falls below ±5 volts. In this example it has been assumed that a gain of 16 (24 db) is too large so that the output of threshold detector 352 is true at time $t_6$. This causes the down-ranging sequence to begin by stepping the gain down to 4 at time $t_6$. But since the output of down range detector 352 is still true, down range clock 354 sends out a second pulse at $t_6$. This causes amplifier 324 to range down to a gain of 1. A gain of 1 on amplifier 324 is communicated to down range 354 through inhibit line 356 and thereby stops the down ranging sequence.

By the time the summing multiplexer 210 looks at channel 10, all of the ranging and switching transients have decayed. As the summing multiplexer 210 leaves channel 10, the process repeats itself and channel 20 is selected by the gain-ranging multiplexer 200.

While the invention has been particularly shown and described with reference to preferred embodiments thereof, it will be understood by those skilled in the art that the foregoing and other changes in form and details may be made therein without departing from the spirit and scope of the invention.

We claim:

1. A time-shared instantaneous gain-ranging amplifier system, comprising:
 1. a plurality of channels, each channel including
  a. a preamplifier,
  b. a filter means operatively attached to said amplifier, and
  c. at least two gain-ranging multiplexers each having a single output and at least as many inputs between them to cover all channels, each of said gain-ranging multiplexer inputs being operatively connected to one of said filter means, said gain-ranging multiplexer being switchable between at least two gain positions in response to the output signal level of said gain-ranging multiplexer for each input channel connected thereto;
 2. a second multiplexer means having a plurality of inputs and a single output, each of said inputs being operatively connected to the output of one of said gain-ranging multiplexers, said second multiplexer means being adapted to sequentially connect each of said gain-ranging multiplexer outputs to the output of said multiplexer switch;
 3. a sample and hold means connected to the output of said multiplexer;
 4. an instantaneous gain-ranging amplifier connected to the output of said sample and hold means, said instantaneous gain-ranging amplifier having a plurality of cascaded 6 db gain stages, an output circuit and means for instantaneously connecting a given gain stage to said output circuit in response to the input signal level, whereby the output of said instantaneous gain-ranging amplifier remains within one digital bit of full scale on an analog-digital converter.

2. The apparatus of claim 1 wherein said gain-ranging multiplexer comprises:
 a plurality of inputs,
 a multiplexer means connected thereto for sequentially connecting each input to a single output channel of said multiplexer means;
 an operational amplifier having an input and feedback impedance, said feedback impedance being switchable between at least two impedance levels, the input to said operational amplifier means connected to the output of said multiplexer means;
 threshold detector means connected to the output of said operational amplifier means, and
 means for maintaining the output of said operational amplifier means below a predetermined level, said means being connected between said threshold means and said amplifier means.

3. The apparatus of claim 1 wherein:
 each input channel includes a pair of electrolytic capacitors connected in parallel;
 dc bias means connected thereto for minimizing the dc leakage current flowing therebetween.

4. The apparatus of claim 1 wherein said gain-ranging multiplexer comprises:
 a plurality of input channels;
 multiplexer means connected thereto for sequentially connecting each input channel to the output of said multiplexer means;
 gain-ranging amplifier means comprising
  a. a first operational amplifier having its inverting input connected to the output of said multiplexing means, said first operational amplifier having a feedback impedance switchable between at least two impedance levels;
  b. a second operational amplifier having its positive input connected to the output of said first operational amplifier, said second operational amplifier having a unity gain;
  c. means for detecting a threshold voltage and supplying an output signal in response thereto, said means having its input connected to the output of said first amplifier means;
  d. clock means for providing a series of output clock pulses in response to an enabling input signal, said input being connected to the output of said threshold detector whereby a string of output pulses are supplied by said clock means upon receiving a signal from said threshold detector;
  e. gain code logic means connected to the output of said clock means, said means having a plurality of stable states each corresponding to a particular impedance level and being switchable between states in response to signals from said clock means, said flip-flop means further having input means for independently setting the state thereof;
  f. means connected to said flip-flop means for setting the initial logic state thereof;
  g. decoder and switch driver means connected to the output of said flip-flop impedance level means for converting the digital output signal of said flip-flop means to an output signal on one of the output lines of said decoder and switch driver.

* * * * *